(12) United States Patent
Chen

(10) Patent No.: US 10,621,926 B2
(45) Date of Patent: Apr. 14, 2020

(54) LIQUID CRYSTAL DISPLAY DEVICE

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (TW)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 25 days.

(21) Appl. No.: 16/087,525

(22) PCT Filed: Dec. 16, 2017

(86) PCT No.: PCT/CN2017/116718
§ 371 (c)(1),
(2) Date: Sep. 21, 2018

(87) PCT Pub. No.: WO2018/121305
PCT Pub. Date: Jul. 5, 2018

(65) Prior Publication Data
US 2019/0114978 A1    Apr. 18, 2019

(30) Foreign Application Priority Data
Dec. 27, 2016    (CN) .......................... 2016 1 1229076

(51) Int. Cl.
*G09G 5/00*        (2006.01)
*G09G 3/34*        (2006.01)
(Continued)

(52) U.S. Cl.
CPC ......... *G09G 3/3413* (2013.01); *G02F 1/1368* (2013.01); *G02F 1/13306* (2013.01);
(Continued)

(58) Field of Classification Search
CPC .. G09G 3/3413; G09G 3/3426; G09G 3/3607; G09G 3/3648; G09G 3/3666;
(Continued)

(56) References Cited

U.S. PATENT DOCUMENTS 8,184,245 B2 * 5/2012 Ohashi .............. G02F 1/133603
349/117
8,384,654 B2 * 2/2013 Fujine ................ G09G 3/3406
345/102

(Continued)

*Primary Examiner* — Vijay Shankar
(74) *Attorney, Agent, or Firm* — WPAT, PC

(57) ABSTRACT

The disclosure relates to a liquid crystal display device. The liquid crystal display device includes a drive component, connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; and a backlight control component, connected to the drive component; wherein the backlight control component is configured to determine a backlight brightness adjusting signal of each backlight subarea according to the drive voltages of a first frame image region and a second frame image region corresponding to each backlight subarea.

20 Claims, 5 Drawing Sheets

First frame    Second frame

(51) Int. Cl.
G02F 1/133 (2006.01)
G09G 3/20 (2006.01)
G02F 1/13357 (2006.01)
G02F 1/1368 (2006.01)
G09G 3/36 (2006.01)
G02F 1/1345 (2006.01)

(52) U.S. Cl.
CPC ...... *G02F 1/13452* (2013.01); *G02F 1/13454* (2013.01); *G02F 1/133602* (2013.01); *G02F 1/133611* (2013.01); *G09G 3/2003* (2013.01); *G09G 3/3426* (2013.01); *G09G 3/3607* (2013.01); *G09G 3/3648* (2013.01); *G09G 3/3666* (2013.01); *G02F 1/133621* (2013.01); *G02F 2001/133601* (2013.01); *G09G 2300/0426* (2013.01); *G09G 2300/0452* (2013.01); *G09G 2310/08* (2013.01); *G09G 2320/028* (2013.01); *G09G 2320/0233* (2013.01); *G09G 2320/0247* (2013.01); *G09G 2320/0285* (2013.01); *G09G 2320/066* (2013.01); *G09G 2320/0626* (2013.01); *G09G 2320/0646* (2013.01); *G09G 2360/16* (2013.01)

(58) Field of Classification Search
CPC ......... G09G 3/2003; G09G 2300/0426; G09G 2320/0233; G09G 2320/0646; G09G 2320/066; G09G 2320/0626; G09G 2310/08; G09G 2360/16; G09G 2320/0285; G09G 2320/0247; G09G 2320/028; G09G 2300/0452
See application file for complete search history.

(56) References Cited

U.S. PATENT DOCUMENTS

| | | | |
|---|---|---|---|
| 10,013,927 B2* | 7/2018 | Zhou | G09G 3/3413 |
| 10,282,825 B2* | 5/2019 | Abe | G06T 5/50 |
| 2018/0217438 A1* | 8/2018 | Niu | G02F 1/133512 |
| 2019/0101796 A1* | 4/2019 | Chen | G09G 3/3607 |
| 2019/0114975 A1* | 4/2019 | Chen | G09G 3/3607 |
| 2019/0325837 A1* | 10/2019 | Chen | G09G 3/3696 |

* cited by examiner

First frame        Second frame

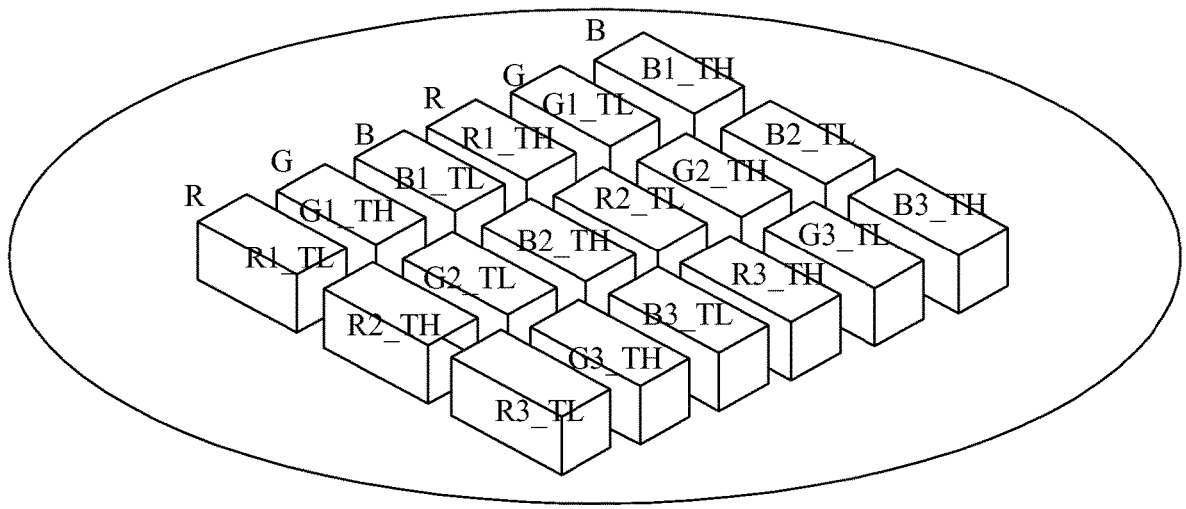

FIG. 5

| Counting average drive voltages of the sub-pixels of various colors in the first frame image area and the second frame image area corresponding to each backlight sub-area | S 210 |

| Solving the backlight brightness adjustment signals according to the average drive voltages, reference backlight brightness signals and reference drive voltages of respective backlight sub-areas | S 220 |

FIG. 6

LIQUID CRYSTAL DISPLAY DEVICE

FIELD OF THE DISCLOSURE

The disclosure relates to the field of liquid crystal display technologies, and more particularly to a liquid crystal display device.

BACKGROUND

Typical large-size liquid crystal display devices most adopt a negative type VA liquid crystal or IPS liquid crystal technology. The VA type liquid crystal driving is fast saturated with a drive voltage under a large viewing angle, which leads to relatively severe viewing angle color cast and further affects a picture quality.

SUMMARY

On such basis, it is necessary to provide a liquid crystal display device, which can improve the defect of viewing angle color cast.

A liquid crystal display device provided by the disclosure includes a backlight component divided into a plurality of backlight sub-areas, wherein the liquid crystal display device further includes a display panel having a display component, wherein pixels on the display panel are divided into a plurality of pixel groups, each pixel group includes a first pixel group and a second pixel group adjacent to each other, and each of the first pixel group and the second pixel group includes a first sub-pixel, a second sub-pixel and a third sub-pixel; a control component, configured to look up a table to acquire a first voltage signal and a second voltage signal unequal to each other and corresponding to each sub-pixel according to a picture input signal, and enabling a front viewing angle mixing brightness of the sub-pixel alternately driven by the first voltage signal and the second voltage signal to be equivalent to a front viewing angle brightness of the sub-pixel driven by the picture input signal, wherein the picture input signal includes a first picture and a second picture in adjacent timing sequence; a drive component, connected to the display component and the control component respectively, and configured to display each picture with two frame images in sequence; the drive component and the display component are integrated on the display panel; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; wherein the drive component is further configured to enable the first voltage signal and the second voltage signal of the first sub-pixel of the first pixel group of the first picture to drive the first sub-pixel of the first pixel group and the second pixel group of the first picture respectively; further configured to enable the second voltage signal and the first voltage signal of the second sub-pixel of the second pixel group of the first picture to drive the second sub-pixel of the first pixel group and the second pixel group of the first picture respectively; further configured to enable the second voltage signal and the first voltage signal of the first sub-pixel of the second pixel group of the second picture to drive the first sub-pixel of the first pixel group and the second pixel group of the second picture respectively; and further configured to enable the first voltage signal and the second voltage signal of the second sub-pixel of the first pixel group of the second picture to drive the second sub-pixel of the first pixel group and the second pixel group of the second picture respectively; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a backlight adjusting component, connected to the backlight control component and the backlight component respectively, and configured to perform independent brightness adjustment on a backlight source of the sub-pixels of various colors in corresponding backlight sub-areas in respective frame images of a next picture.

In one of the embodiments, the liquid crystal display device further includes a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

In one of the embodiments, the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas.

In one of the embodiments, a calculating formula for the calculating unit to solve the backlight brightness adjustment signal of the sub-pixels of each color in each backlight sub-area is as follows: $A_{M\_P1}*P_{M\_ave1}=A_{M\_P2}*P_{M\_ave2}$; $2*A_{M\_P}*P_{M\_ave}=A_{M\_P1}*P_{M\_ave1}+A_{M\_P2}*P_{M\_ave2}$; wherein P represents a target color sub-pixel; M represents a serial number of the backlight sub-area; AM_P1 represents the backlight brightness adjustment signal for performing backlight brightness adjustment on a backlight source of P sub-pixels in the backlight sub-area M corresponding to the first frame image of the next picture; AM_P2 represents the backlight brightness adjustment signal for performing backlight brightness adjustment on a backlight source of the P sub-pixels in the backlight sub-area M corresponding to the second frame image of the next picture; PM_ave1 represents an average value of the drive voltages of the P sub-pixels in the backlight sub-area M corresponding to the first frame image of the current picture; PM_ave2 represents an average value of the drive voltages of the P sub-pixels in the backlight sub-area M corresponding to the second frame image of the current picture; AM_P represents the reference backlight brightness signal of the P sub-pixels in the backlight sub-area M corresponding to the image of the current picture; and PM_ave represents the average value of reference drive voltages of the P sub-pixels in the frame image area corresponding to the backlight sub-area M on the image of the current picture.

In one of the embodiments, the backlight source is a white light backlight source, an RGB backlight source, an RGBW backlight source or RGBY backlight source.

In one of the embodiments, the liquid crystal display device further includes a display panel, wherein the display component and the drive component are integrated on the display panel.

In one of the embodiments, the liquid crystal display device further includes a backlight module, wherein the backlight component, the backlight control component and the backlight adjusting component are integrated on the backlight module.

In one of the embodiments, the drive component further includes a timing controller.

In one of the embodiments, the first sub-pixel is a red sub-pixel, and the second sub-pixel is a green sub-pixel.

In one of the embodiments, the third sub-pixel is a blue sub-pixel, and the drive component is further configured to enable the first voltage signal and the second voltage signal of the blue sub-pixel of the first pixel group of the first picture to drive the blue sub-pixel of the first pixel group and the second pixel group of the first picture respectively; and further configured to enable the second voltage signal and the first voltage signal of the blue sub-pixel of the second pixel group of the second picture to drive the blue sub-pixel of the first pixel group and the second pixel group of the second picture respectively.

In one of the embodiments, the third sub-pixel is a blue sub-pixel, and the drive component is further configured to enable the second voltage signal and the first voltage signal of the blue sub-pixel of the second pixel group of the first picture to drive the blue sub-pixel of the first pixel group and the second pixel group of the first picture respectively; and further configured to enable the first voltage signal and the second voltage signal of the blue sub-pixel of the first pixel group of the second picture to drive the blue sub-pixel of the first pixel group and the second pixel group of the second picture respectively.

In one of the embodiments, the third sub-pixel is the blue sub-pixel, and the blue sub-pixel is driven by an original picture input signal.

In one of the embodiments, the first pixel group and the second pixel group are in a same column and disposed adjacently, and the first pixel group in one pair of pixel groups in adjacent two pairs of pixel groups is adjacent to the second pixel group of the other pair of pixel groups.

In one of the embodiments, the first pixel group and the second pixel group are in a same row and disposed adjacently, and the first pixel group in one pair of pixel groups in adjacent two pairs of pixel groups is adjacent to the second pixel group of the other pair of pixel groups.

In one of the embodiments, the display panel is a twisted nematic liquid crystal display panel, an optically compensated birefringence liquid crystal display panel or vertical alignment liquid crystal display panel.

In one of the embodiments, the display panel is an RGB three-primary color panel, an RGBW four-color panel and an RGBY four-color panel.

The disclosure further provides a liquid crystal display device, including a display component and a backlight component divided into a plurality of backlight sub-areas, wherein the liquid crystal display device further includes a drive component, connected to the display component, and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; wherein the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas; a backlight adjusting component, connected to the backlight control component and the backlight component respectively, and configured to perform independent brightness adjustment on a backlight source of the sub-pixels of various colors in corresponding backlight sub-areas in respective frame images of a next picture; and a backlight module, wherein the backlight component, the backlight control component and the backlight adjusting component are integrated on the backlight module.

In one aspect, according to the liquid crystal display device provided by the disclosure, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

In the other aspect, the pixels on the display panel are divided into a plurality of pixel groups, each pair of pixel groups includes first pixel group and a second pixel group adjacent to each other, the first pixel group and the second include a first sub-pixel, a second sub-pixel and a third sub-pixel respectively, a table is looked up to acquire a first voltage signal and a second voltage signal unequal to each other and corresponding to each sub-pixel according to a picture input signal, and a front viewing angle mixing brightness of the sub-pixel alternately driven by the first voltage signal and the second voltage signal is enabled to be equivalent to a front viewing angle brightness of the sub-pixel driven by the picture input signal, wherein the picture input signal includes a first picture and a second picture in adjacent timing sequence. In the first picture, a high voltage signal and a low voltage signal are respectively acquired for the first sub-pixel of the first pixel group and the second pixel group, and a low voltage signal and a high voltage signal are respectively acquired for the second sub-pixel of the first pixel group and the second pixel group. In the second picture, a low voltage signal and a high voltage signal are respectively acquired for the first sub-pixel of the first pixel group and the second pixel group, and a high voltage signal and a low voltage signal are respectively acquired for the second sub-pixel of the first pixel group and the second pixel group. A color cast compensation effect can be realized while the picture content is presented and the resolution is maintained with an original picture input signal frequency. The first picture and the second picture in adjacent timing sequence represent that position interchange of the sub-pixels of a resolution signal achieves more perfect resolution maintaining, and the complete image resolution is kept.

BRIEF DESCRIPTION OF THE DRAWINGS

FIGS. 4 and 5 are partial enlarged views in FIG. 3.

FIG. 6 is a specific flowchart of step S120 in FIG. 1.

DETAILED DESCRIPTION OF PREFERRED EMBODIMENTS

In order to make the objects, technical solutions and advantages of the disclosure clearer, the disclosure is further described in detail in combination with drawings and embodiments. It should be understood that the specific embodiments described here are merely intended for explaining rather than limiting the disclosure.

Figure 1:
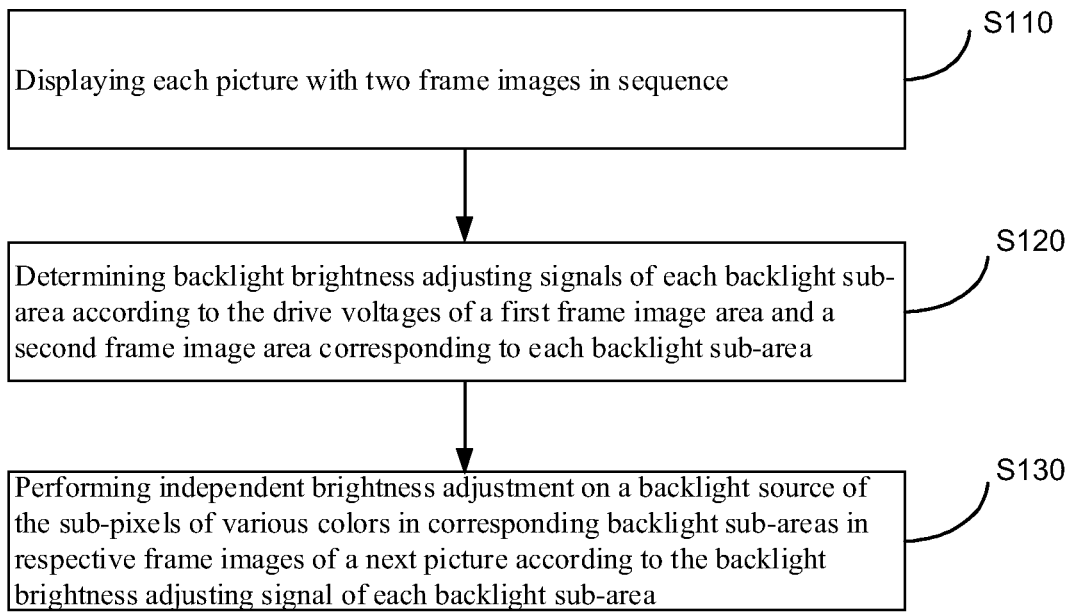
FIG. 1 is a flowchart of a driving method for a liquid crystal display device in one embodiment.
Figure 2:
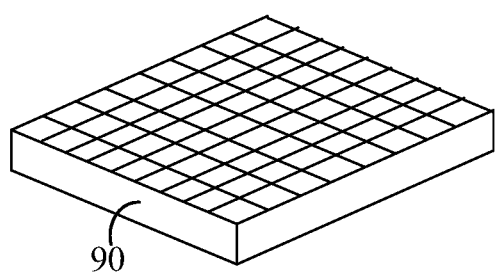
FIG. 2 is a schematic view of sub-areas of a backlight area of the liquid crystal display device in FIG. 1.

FIG. 1 is a flowchart of a driving method for a liquid crystal display device in one embodiment. The liquid crystal display device may be a TN, OCB, VA type or curve surface liquid crystal display device, but not limited thereto. The liquid crystal display device can apply straight down backlight, and a backlight source may be white light, an RGB thee-color light source, an RGBW four-color light source or an RGBY four-color light source, but not limited thereto. The driving method is also suitable for a scenario that a display panel of the liquid crystal display device is a curve panel. In the present embodiment, a backlight area of the liquid crystal display device is divided into a plurality of backlight sub-areas, as shown in FIG. 2. In FIG. 2, 90 represents a backlight component (or backlight module).

Referring to FIG. 1, the method includes the following steps.

S110 displaying each picture with two frame images in sequence.

Figure 3:
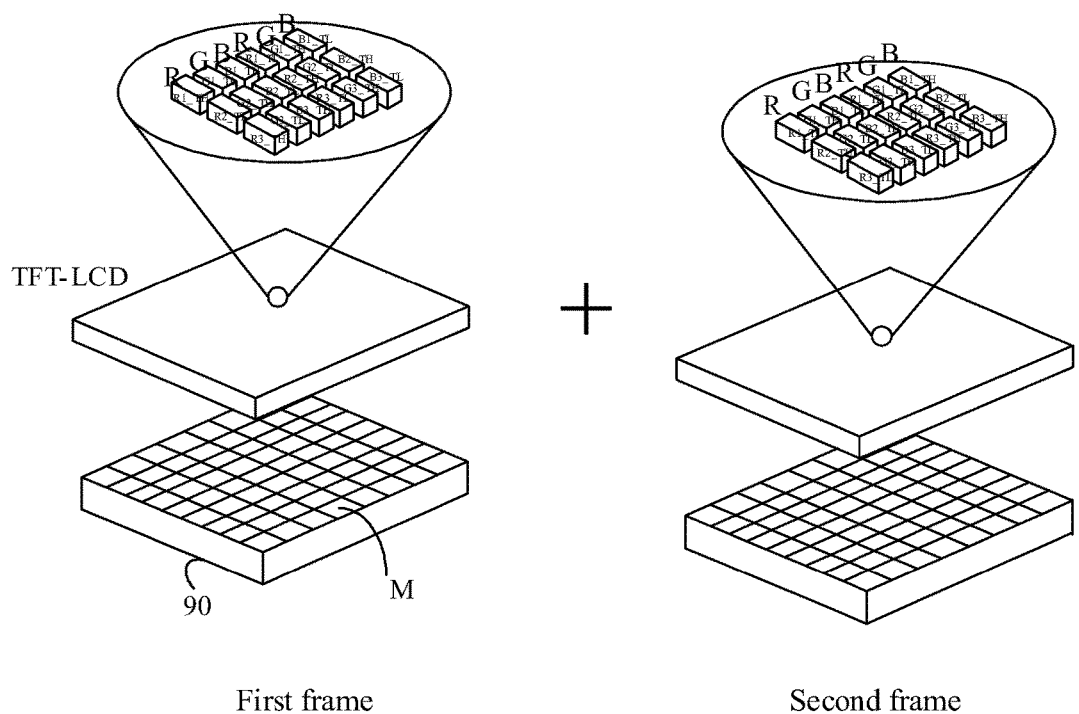
FIG. 3 is a schematic view of driving a display area of the liquid crystal display device in FIG. 1.
Figure 4:
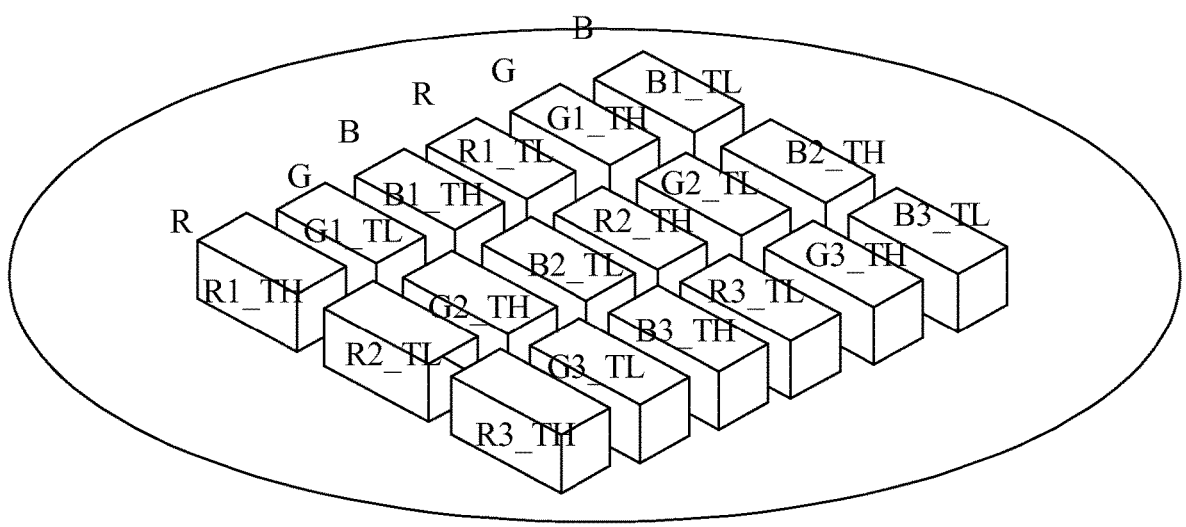

Each picture frame_N (i.e., a typical frame picture) is displayed with two frame images in sequence, that is, the picture is divided into two images on timing sequence. By dividing the picture on the timing sequence, a frame frequency can be doubled, that is, the original 60 Hz is doubled to 120 Hz. The two frame images are a first frame image (frame_N-1) and a second frame image (frame_N-2) respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for each sub-pixel in the first frame image and the second frame image may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. Seen from a 8 bit drive signal, input color gray scale values 0-255 of every R/G/B input signal correspond to 256 pairs of high and low voltage signals, and there are 3*256 pairs of high voltage signals $R_{TH}/G_{TH}/B_{TH}$ and low voltage signals $R_{TL}/G_{TL}/B_{TL}$ in total. Therefore, the corresponding high drive voltage and the corresponding low drive voltage can be looked up according to the color gray scale value of each sub-pixel in the input signal, such that the corresponding sub-pixel in the first frame image is driven by the high drive voltage, and the corresponding sub-pixel in the second frame image is driven by the low drive voltage, or the corresponding sub-pixel in the first frame image is driven by the low drive voltage, and the corresponding sub-pixel in the second frame image is driven by the high drive voltage, and meanwhile, the adjacent two sub-pixels are driven by a driving manner of alternate high and low drive voltages, as shown in FIG. 3. Wherein FIG. 4 is a partial enlarged view in a first frame in FIG. 3, and FIG. 5 is a partial enlarged view in a second frame in FIG. 3.

S120 determining backlight brightness adjusting signals of each backlight sub-area according to the drive voltages of a first frame image area and a second frame image area corresponding to each backlight sub-area.

The backlight brightness adjusting signals are configured to perform backlight brightness adjustment on two frame images in a next picture, to reduce a viewing angle color cast of the picture. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signals is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

In the present embodiment, a flow of determining the backlight brightness adjusting signals is as shown in FIG. 6, and includes S210 and S220.

S210 counting average drive voltages of the sub-pixels of various colors in the first frame image area and the second frame image area corresponding to each backlight sub-area.

A calculating formula for the average drive voltage of the sub-pixels of each color in the corresponding first frame image area in each backlight sub-area is as follows:

$$P_{M\_ave1}=\text{Ave}(P_{M\_n\_TL}, P_{M\_n+1\_TH}, P_{M\_n+2\_TL}, \ldots), n=1,2,3 \ldots.$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1}=\text{Ave}(R_{M\_n\_TL}, R_{M\_n+1\_TH}, R_{M\_n+2\_TL}, \ldots), n=1,2,3 \ldots;$$

$$G_{M\_ave1}=\text{Ave}(G_{M\_n\_TH}, G_{M\_n+1\_TL}, G_{M\_n+2\_TH}, \ldots, n=1,2,3 \ldots;$$

$$B_{M\_ave1}=\text{Ave}(B_{M\_n\_TL}, B_{M\_n+1\_TH}, B_{M\_n+2\_TL}, \ldots, n=1,2,3 \ldots.$$

S220 solving the backlight brightness adjustment signals according to the average drive voltages, reference backlight brightness signals and reference drive voltages of respective backlight sub-areas.

The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source corresponding to the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $A_{M\_P}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1}=\text{Ave}(P_n+P_{n+1}+P_{n+2}+\ldots), n=1,2,3 \ldots$.

In the present embodiment, one pixel of each frame image includes an R sub-pixel, a G sub-pixel and a B sub-pixel. Therefore, correspondingly, it is required to solve the backlight brightness adjusting signals of the backlight source of the sub-pixels of various colors in each backlight sub-area, specifically:

A solving formula for the backlight brightness adjusting signals $A_{M\_R1}$ and $A_{M\_R2}$ of the R sub-pixels in the backlight sub-area M is $$A_{M\_R1}*R_{M\_ave1}=A_{M\_R2}*R_{M\_ave2};$$

$$2*A_{M\_R}*R_{M\_ave}=A_{M\_R1}*R_{M\_ave1}+A_{M\_R2}*R_{M\_ave2}.$$

A solving formula for the backlight brightness adjusting signals $A_{M\_G1}$ and $A_{M\_G2}$ of the G sub-pixels in the backlight sub-area M is $$A_{M\_G1}*G_{M\_ave1}=A_{M\_G2}*G_{M\_ave2};$$

$$2*A_{M\_G}*G_{M\_ave}=A_{M\_G1}*G_{M\_ave1}+A_{M\_G2}*G_{M\_ave2}.$$

A solving formula for the backlight brightness adjusting signals $A_{M\_B1}$ and $A_{M\_B2}$ of the B sub-pixels in the backlight sub-area M is $$A_{M\_B1}*B_{M\_ave1}=A_{M\_B2}*B_{M\_ave2};$$

$$2*A_{M\_B}*B_{M\_ave}=A_{M\_B1}*B_{M\_ave1}+A_{M\_B2}*B_{M\_ave2}.$$

S130 performing independent brightness adjustment on a backlight source of the sub-pixels of various colors in corresponding backlight sub-areas in respective frame images of a next picture according to the backlight brightness adjusting signal of each backlight sub-area.

In the adjusting process, the backlight sources of the R sub-pixels, the G sub-pixels and the B sub-pixels in the corresponding backlight sub-area M of the first frame image in the next picture are independently adjusted according to $A_{M\_R1}$, $A_{M\_G1}$ and $A_{M\_B1}$, and the backlight sources of the R sub-pixels, the G sub-pixels and the B sub-pixels in the corresponding backlight sub-area M of the second frame image in the next picture are independently adjusted according to $A_{M\_R2}$, $A_{M\_G2}$ and $A_{M\_B2}$, such that the compensated picture brightness is same as the picture brightness not compensated by the high and low voltages (i.e., typical driving). By independent backlight source control, the flickering discomfort phenomenon visible to naked eyes caused by a switching difference of the high and low voltages during driving can be reduced, and the defect of color cast caused by mismatch of a large viewing angle refractive index of the liquid crystal display device is effectively improved.

According to the driving method for a liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

Figure 7:
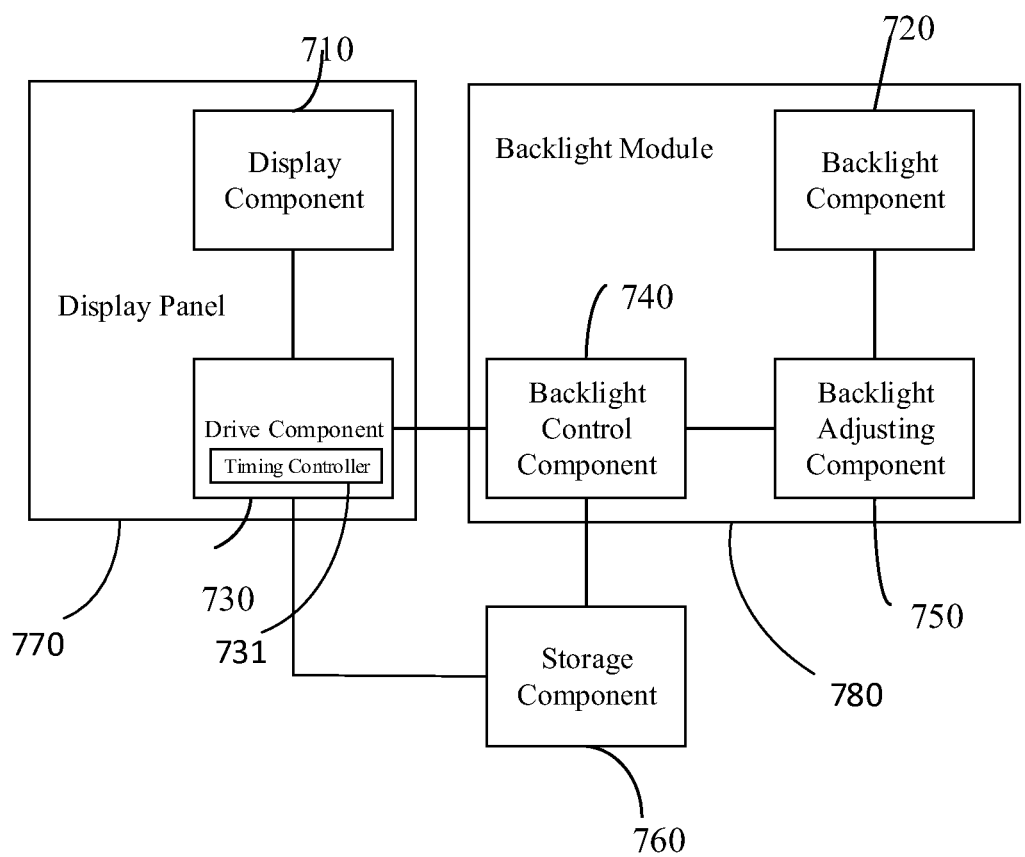
FIG. 7 is a structural block diagram of a liquid crystal display device in one embodiment.

The disclosure further provides a liquid crystal display device, as shown in FIG. 7. The liquid crystal display device may execute the above driving method. The liquid crystal display device includes a display component 710 and a backlight component 720 and further includes a drive component 730, a backlight control component 740 and a backlight adjusting component 750. Wherein the liquid crystal display device further includes a display panel 770, the display panel 770 includes the display component 710, the drive component 730 can be integrated on a display panel 770, and the backlight component 720, the backlight control component 740 and the backlight adjusting component 750 can be integrated on the backlight module 780. It is understandable that an integration manner of respective components is not limited thereto.

The display component 710 may adopt a TN, OCB or VA type TFT display panel, but not limited thereto. The display component 710 can be a display component having a curve surface panel.

The backlight component 720 is configured to provide backlight. The backlight component 720 may apply straight down backlight, and a backlight source may be white light, an RGB thee-color light source, an RGBW four-color light source or an RGBY four-color light source, but not limited thereto. The backlight area of the backlight component 720 is divided into a plurality of backlight subareas, as shown in FIG. 2.

The drive component 730 is connected to the display component 710. The drive component 730 is configured to display each picture with two frame images. The two frame images are a first frame image and a second frame image respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for the drive component 730 to drive each sub-pixel may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. The drive component 730 includes a timing control circuit 731 (timing controller). In one embodiment, the liquid crystal display device further includes a storage device 760, for storing the lookup table.

The backlight control component 740 is connected to the drive component 730 and configured to determine backlight brightness adjusting signals of each backlight sub-area according to the drive voltages of a first frame image area and a second frame image area corresponding to each backlight sub-area. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signal is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

Figure 8:
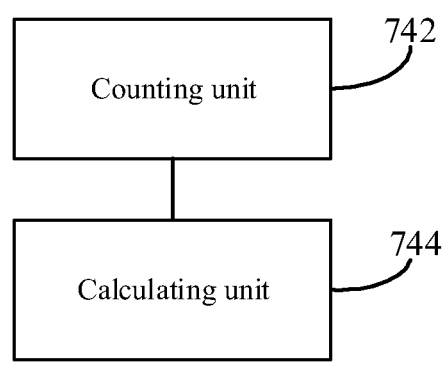
FIG. 8 is a structural block diagram of a backlight control component in one embodiment.

The backlight control component 740 includes a counting unit 742 and a calculating unit 744, as shown in FIG. 8. Wherein a formula for the counting unit 742 to calculate the average drive voltage of the sub-pixels of each color in the corresponding first frame image area in each backlight sub-area is as follows:

$$P_{M\_ave1} = \text{Ave}(P_{M\_n\_TL}, P_{M\_n+1\_TH}, P_{M\_n+2\_TL}, \ldots), n=1,2,3 \ldots$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1} = \text{Ave}(R_{M\_n\_TL}, R_{M\_n+1\_TH}, R_{M\_n+2\_TL}, \ldots), n=1,2,3 \ldots;$$

$$G_{M\_ave1} = \text{Ave}(G_{M\_n\_TH}, G_{M\_n+1\_TL}, G_{M\_n+2\_TH}, \ldots, n=1,2,3 \ldots;$$

$$B_{M\_ave1} = \text{Ave}(B_{M\_n\_TL}, B_{M\_n+1\_TH}, B_{M\_n+2\_TL}, \ldots, n=1,2,3 \ldots.$$

The calculating unit 744 is configured to solve the backlight brightness adjustment signals according to the average drive voltages, reference backlight brightness signals and reference drive voltages of respective backlight sub-areas. The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source of the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2}.$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $A_{M\_P}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1}=Ave(P_n+P_{n+1}+P_{n+2}+\ldots)$, $n=1, 2, 3 \ldots$.

The backlight adjusting component 750 is connected to the backlight control component 740 and the backlight component 720 respectively. The backlight adjusting component 750 is configured to perform independent brightness adjustment on a backlight source of the sub-pixels of various colors in corresponding backlight sub-areas in respective frame images of a next picture according to the backlight brightness adjusting signal in each backlight sub-area, such that the compensated picture brightness is same as the picture brightness not compensated by the high and low voltages.

According to the above liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

In another embodiment, in combination with FIG. 7, the liquid crystal display device includes a display panel 770, and the control component 772 is connected to the drive component 730.

Pixels on the display panel 770 are divided into a plurality of pixel groups, each pixel group includes a first pixel group and a second pixel group adjacent to each other, and each of the first pixel group and the second pixel group includes a first sub-pixel, a second sub-pixel and a third sub-pixel.

The control component 772 is configured to look up a table to acquire a first voltage signal and a second voltage signal unequal to each other and corresponding to each sub-pixel according to a picture input signal, and enabling a front viewing angle mixing brightness of the sub-pixel alternately driven by the first voltage signal and the second voltage signal to be equivalent to a front viewing angle brightness of the sub-pixel driven by the picture input signal, wherein the picture input signal includes a first picture and a second picture in adjacent timing sequence.

The drive component 730 is connected to the display component and the control component respectively.

The drive component 730 is configured to enable the first voltage signal and the second voltage signal of the first sub-pixel of the first pixel group of the first picture to drive the first sub-pixel of the first pixel group and the second pixel group of the first picture respectively; and further configured to enable the second voltage signal and the first voltage signal of the second sub-pixel of the second pixel group of the first picture to drive the second sub-pixel of the first pixel group and the second pixel group of the first picture respectively.

The drive component 730 is further configured to enable the second voltage signal and the first voltage signal of the first sub-pixel of the second pixel group of the second picture to drive the first sub-pixel of the first pixel group and the second pixel group of the second picture respectively; and further configured to enable the first voltage signal and the second voltage signal of the second sub-pixel of the first pixel group of the second picture to drive the second sub-pixel of the first pixel group and the second pixel group of the second picture respectively.

Optionally, the first sub-pixel is a red sub-pixel, and the second sub-pixel is a green sub-pixel. In the RGB three primary color sub-pixels, brightness signals of the red sub-pixel and the green sub-pixel are brighter than the brightness signal of the blue sub-pixel, the red sub-pixel and the green sub-pixel will directly affect presentation of a resolution of a viewed image. A color cast compensation effect can be realized while the picture content is presented and the resolution is maintained with an original picture input signal frequency. The first picture and the second picture in adjacent timing sequence represent that position interchange of the sub-pixels of a resolution signal achieves more perfect resolution maintaining, and the complete image resolution is kept.

Figure 9:
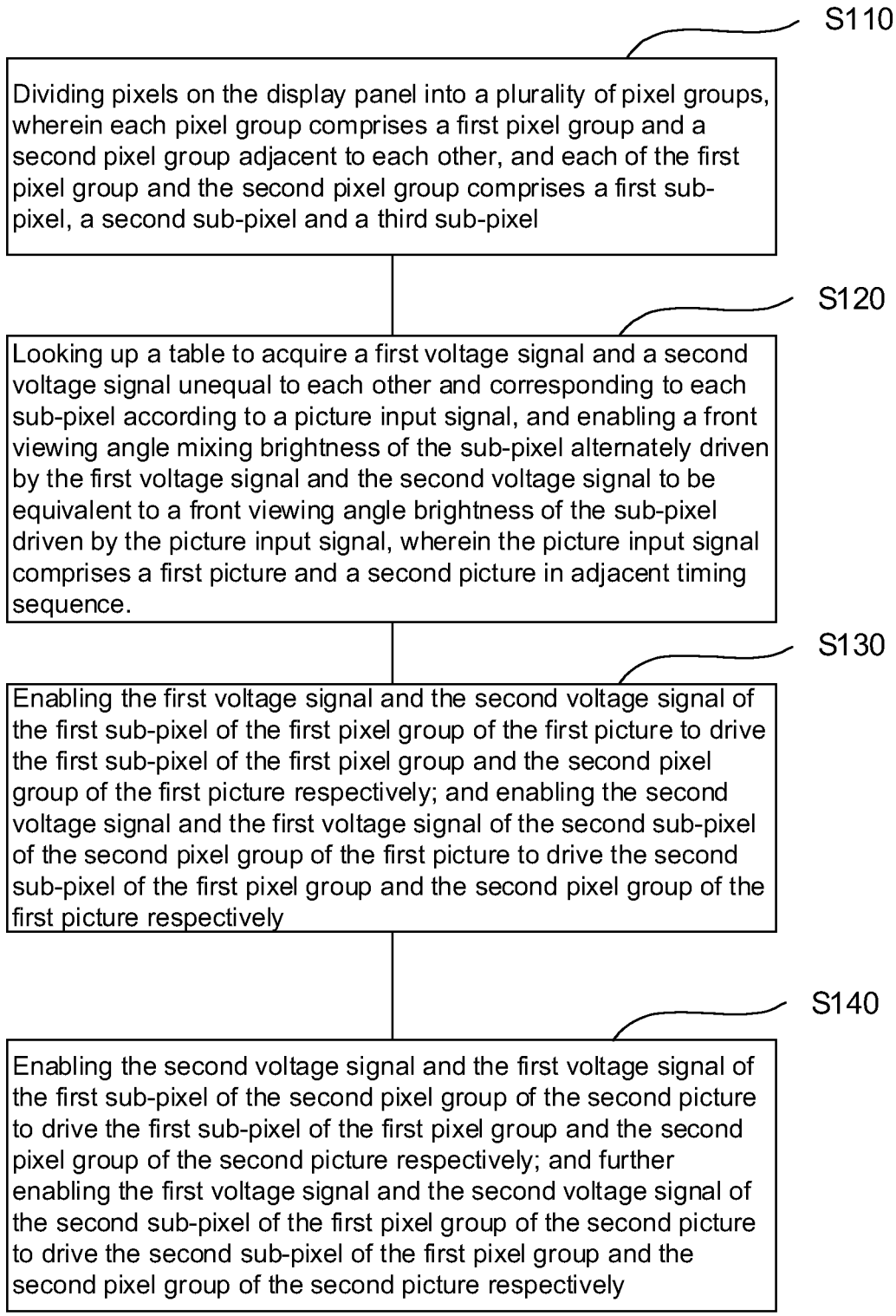
FIG. 9 is a flowchart of a driving method for a display panel in another embodiment.

Referring to FIG. 9, the driving method for a display panel of the liquid crystal display device includes the following steps.

S110 dividing pixels on the display panel into a plurality of pixel groups, wherein each pixel group includes a first pixel group and a second pixel group adjacent to each other, and each of the first pixel group and the second pixel group includes a first sub-pixel, a second sub-pixel and a third sub-pixel.

S120 looking up a table to acquire a first voltage signal and a second voltage signal unequal to each other and corresponding to each sub-pixel according to a picture input signal, and enabling a front viewing angle mixing brightness of the sub-pixel alternately driven by the first voltage signal and the second voltage signal to be equivalent to a front viewing angle brightness of the sub-pixel driven by the picture input signal, wherein the picture input signal includes a first picture and a second picture in adjacent timing sequence.

S130 enabling the first voltage signal and the second voltage signal of the first sub-pixel of the first pixel group of the first picture to drive the first sub-pixel of the first pixel group and the second pixel group of the first picture respectively; and enabling the second voltage signal and the first voltage signal of the second sub-pixel of the second pixel group of the first picture to drive the second sub-pixel of the first pixel group and the second pixel group of the first picture respectively.

S140 enabling the second voltage signal and the first voltage signal of the first sub-pixel of the second pixel group of the second picture to drive the first sub-pixel of the first pixel group and the second pixel group of the second picture respectively; and further enabling the first voltage signal and the second voltage signal of the second sub-pixel of the first pixel group of the second picture to drive the second sub-pixel of the first pixel group and the second pixel group of the second picture respectively.

In the first picture, a high voltage signal and a low voltage signal are respectively acquired for the first sub-pixel of the first pixel group and the second pixel group, and a low voltage signal and a high voltage signal are respectively acquired for the second sub-pixel of the first pixel group and the second pixel group. In the second picture, a low voltage signal and a high voltage signal are respectively acquired for the first sub-pixel of the first pixel group and the second pixel group, and a high voltage signal and a low voltage signal are respectively acquired for the second sub-pixel of the first pixel group and the second pixel group. A color cast compensation effect can be realized while the picture content is presented and the resolution is maintained with an original picture input signal frequency. The first picture and the second picture in adjacent timing sequence represent that position interchange of the sub-pixels of a resolution signal achieves more perfect resolution maintaining, and the complete image resolution is kept. The first sub-pixel is a red sub-pixel, and the second sub-pixel is a green sub-pixel. In the RGB three primary color sub-pixels, brightness signals of the red sub-pixel and the green sub-pixel are brighter than the brightness signal of the blue sub-pixel, the red sub-pixel and the green sub-pixel will directly affect presentation of a resolution of a viewed image. A color cast compensation effect can be realized while the picture content is presented and the resolution is maintained with an original picture input signal frequency. The first picture and the second picture in adjacent timing sequence represent that position interchange of the sub-pixels of a resolution signal achieves more perfect resolution maintaining, and the complete image resolution is kept.

For the step 120, a first voltage signal and a second voltage signal unequal to each other and corresponding to each sub-pixel are acquired by a preset rule according to a picture input signal, and a front viewing angle mixing brightness of the sub-pixel alternately driven by the first voltage signal and the second voltage signal is enabled to be equivalent to a front viewing angle brightness of the sub-pixel driven by the picture input signal, wherein the picture input signal includes a first picture and a second picture in adjacent timing sequence.

Specifically, the picture input signal includes a first picture and a second picture in adjacent timing sequence, as shown in table 1 and table 2.

TABLE 1

| R1,1 | G1,1 | B1,1 | R1,2 | G1,2 | B1,2 | R1,3 | G1,3 | B1,3 |
| R2,1 | G2,1 | B2,1 | R2,2 | G2,2 | B2,2 | R2,3 | G2,3 | B2,3 |
| R3,1 | G3,1 | B3,1 | R3,2 | G3,2 | B3,2 | R3,3 | G3,3 | B3,3 |
| R4,1 | G4,1 | B4,1 | R4,2 | G4,2 | B4,2 | R4,3 | G4,3 | B4,3 |
| R5,1 | G5,1 | B5,1 | R5,2 | G5,2 | B5,2 | R5,3 | G5,3 | B5,3 |

TABLE 2

| R' 1,1 | G' 1,1 | B' 1,1 | R' 1,2 | G' 1,2 | B' 1,2 | R' 1,3 | G' 1,3 | B' 1,3 |
| R' 2,1 | G' 2,1 | B' 2,1 | R' 2,2 | G' 2,2 | B' 2,2 | R' 2,3 | G' 2,3 | B' 2,3 |
| R' 3,1 | G' 3,1 | B' 3,1 | R' 3,2 | G' 3,2 | B' 3,2 | R' 3,3 | G' 3,3 | B' 3,3 |
| R' 4,1 | G' 4,1 | B' 4,1 | R' 4,2 | G' 4,2 | B' 4,2 | R' 4,3 | G' 4,3 | B' 4,3 |
| R' 5,1 | G' 5,1 | B' 5,1 | R' 5,2 | G' 5,2 | B' 5,2 | R' 5,3 | G' 5,3 | B' 5,3 |

Further, by taking an RGB three-primary color display panel as an example and the red sub-pixel as an example, the red sub-pixel signal $R_{i,j}$ is resolved into a high voltage $RH_{i,j}$ picture box and a low voltage $RL_{i,j}$ picture box, and the high voltage picture box and the low voltage picture box are sequentially displayed in adjacent two timing sequences. A synthetic effect of the high voltage picture box and the low voltage picture box is equivalent to the brightness of respective sub-pixels of the original picture box. The high voltage picture box and the low voltage picture box signals replace the original picture box signal to achieve the front viewing brightness and the unchanged brightness of the original image signal. The high voltage picture box and the low voltage picture box are displayed on adjacent two timing sequences and on the timing sequence through the side viewing upper viewing angle. The viewing angle characteristic of the low voltage picture box is applied to improve the viewing angle color cast compared with the brightness saturation phenomenon of the original picture box. The high first voltage signal and the low second voltage signal of the red sub-pixel R, the green sub-pixel G and the blue sub-pixel B in the picture input signal are the high and low voltage signals given according to the input signals of the red sub-pixel R, the green sub-pixel G and the blue sub-pixel B, are decided according to a viewing angle effect needing to be compensated, and are generally recorded in the display panel in a LUT manner. Further, the LUT is recorded in a hardware frame buffer of the display panel, seen from a 8 bit drive signal, input signals 0-255 of the red sub-pixel R, the green sub-pixel G and the blue sub-pixel B correspond to 256 pairs of high and low voltage signals, and there are 3*256 pairs of high voltage signals RH, GH and BH and low voltage signals RL, GL and BL in total. Wherein the lookup table of the blue sub-pixel is as shown in table 3.

TABLE 3

| Input gray scale values | LUT1 | | LUT2 | |
| --- | --- | --- | --- | --- |
| | BH1 | BL1 | BH2 | BL2 |
| 0 | 0 | 0 | 0 | 0 |
| 1 | 50 | 0 | 40 | 0 |

TABLE 3-continued

| Input gray | LUT1 | | LUT2 | |
|---|---|---|---|---|
| scale values | BH1 | BL1 | BH2 | BL2 |
| 2 | 80 | 5 | 70 | 10 |
| 3 | 100 | 10 | 100 | 35 |
| 4 | 150 | 20 | 180 | 45 |
| 5 | 180 | 40 | 200 | 65 |
| . | . | . | . | . |
| . | . | . | . | . |
| . | . | . | . | . |
| 255 | 255 | 128 | 255 | 160 |

Optionally, the first voltage signal and the second voltage signal corresponding to each sub-pixel are acquired by looking up the table according to the picture input signal. Wherein a front viewing angle mixing brightness of the first voltage signal and the second voltage signal is equivalent to a front viewing angle brightness of the picture input signal. Different lookup tables can be selected according to different conditions, for example, an average value of an original input gray scale value of a pair of pixel group, average values of original input gray scale values of multiple pairs of pixel groups, etc., multiple, for example 2, 5 or 10, lookup tables can be set according to needs. Similarly, multiple lookup tables can also be set for the red sub-pixel and the green sub-pixel.

Further, a large viewing angle mixing brightness of the first voltage signal and the second voltage signal is close to the front viewing angle brightness of original drive data as much as possible. In one embodiment, a difference value between the first voltage signal and the second voltage signal needs to be larger than a difference value range, thereby ensuring that two gray scale values in a target gray scale value pair have a larger gray scale difference. In the present embodiment, the large viewing angle may be defined to be larger than 60°, or user-defined.

For example, in one embodiment, optionally, as shown in table 1, in the first picture, the first pixel group is R1,1, G1,1 and B1,1, and the second pixel group is R2,1, G2,1 and B2,1. As shown in table 4, in the first picture, the red sub-pixel R1,1 of the first pixel group is driven by the first voltage signal RH1,1 of the red sub-pixel of the first pixel group, and the red sub-pixel R2,1 of the second pixel group is driven by the second voltage signal RL1,1 of the red sub-pixel of the first pixel group. The green sub-pixel G1,1 of the first pixel group is driven by the second voltage signal RL2,1 of the green sub-pixel of the second pixel group, and the green sub-pixel G2,1 of the second pixel group is driven by the first voltage signal GH2,1 of the green sub-pixel of the second pixel group.

As shown in table, in the second picture, the first pixel group is R'1,1, G'1,1 and B'1,1, and the second pixel group is R'2,1, G'2,1 and B'2,1. As shown in table 5, in the second picture, the red sub-pixel R1,1 of the first pixel group is driven by the second voltage signal RL'2,1 of the red sub-pixel of the second pixel group, and the red sub-pixel R2,1 of the second pixel group is driven by the first voltage signal RH'2,1 of the red sub-pixel of the second pixel group. The green sub-pixel G1,1 of the first pixel group is driven by the first voltage signal GH'1,1 of the green sub-pixel of the first pixel group, and the green sub-pixel G2,1 of the second pixel group is driven by the second voltage signal GL'1,1 of the green sub-pixel of the first pixel group.

TABLE 4

| RH1,1 | GL2,1 | BH1,1 | RL2,2 | GH1,2 | BL2,2 | RH1,3 | GL2,3 | BH1,3 |
|---|---|---|---|---|---|---|---|---|
| RL1,1 | GH2,1 | BL1,1 | RH2,2 | GL1,2 | BH2,2 | RL1,3 | GH2,3 | BL1,3 |
| RH3,1 | GL4,1 | BH3,1 | RL4,2 | GH3,2 | BL4,2 | RH3,3 | GL4,3 | BH3,3 |
| RL3,1 | GH4,1 | BL3,1 | RH4,2 | GL3,2 | BH4,2 | RL3,3 | GH4,3 | BL3,3 |
| RH5,1 | GL6,1 | BH5,1 | RL6,2 | GH5,2 | BL6,2 | RH5,3 | GL6,3 | BH5,3 |

TABLE 5

| RL' 2,1 | GH' 1,1 | BL' 2,1 | RH' 1,2 | GL' 2,2 | BH' 1,2 | RL' 2,3 | GH' 1,3 | BL' 2,3 |
|---|---|---|---|---|---|---|---|---|
| RH' 2,1 | GL' 1,1 | BH' 2,1 | RL' 1,2 | GH' 2,2 | BL' 1,2 | RH' 2,3 | GL' 1,3 | BH' 2,3 |
| RL' 4,1 | GH' 3,1 | BL' 4,1 | RH' 3,2 | GL' 4,2 | BH' 3,2 | RL' 4,3 | GH' 3,3 | BL' 4,3 |
| RH' 4,1 | GL' 3,1 | BH' 4,1 | RL' 3,2 | GH' 4,2 | BL' 3,2 | RH' 4,3 | GL' 3,3 | BH' 4,3 |
| RL' 6,1 | GH' 5,1 | BL' 6,1 | RH' 5,2 | GL' 6,2 | BH' 5,2 | RL' 6,3 | GH' 5,3 | BL' 6,3 |

In this way, in the first picture, the red sub-pixel R1,1 signal of the first pixel group is reserved, and the red sub-pixel R2,1 signal of the second pixel group is sacrificed. Further, the position of the red sub-pixel of the first pixel group is replaced with the high voltage signal after table looking up, i.e., the first voltage signal RH1,1, and the original image resolution can be kept. The sacrificed position of the red sub-pixel of the second pixel group is replaced with the low voltage signal after table looking up, i.e., the second voltage signal RL1,1, to achieve color cast improving and compensating effects. In the second picture, the red sub-pixel R'2,1 signal of the second pixel group is reserved, and the red sub-pixel R'1,1 signal of the first pixel group is sacrificed. Further, the position of the red sub-pixel of the second pixel group is replaced with the high voltage signal after table looking up, i.e., the first voltage signal R'H2,1, and the original image resolution can be kept. The sacrificed position of the red sub-pixel of the first pixel group is replaced with the low voltage signal after table looking up, i.e., the second voltage signal R'L2,1, to achieve color cast improving and compensating effects.

Similarly, in the first picture, the green sub-pixel G2,1 signal of the second pixel group is reserved, and the green sub-pixel G1,1 signal of the first pixel group is sacrificed. Further, the position of the green sub-pixel of the second pixel group is replaced with the high voltage signal after table looking up, i.e., the first voltage signal GH2,1, and the original image resolution can be kept. The sacrificed position of the green sub-pixel of the first pixel group is replaced with the low voltage signal after table looking up, i.e., the second voltage signal GL2,1, to achieve color cast improving and compensating effects. In the second picture, the green sub-pixel G'1,1 signal of the first pixel group is reserved, and the green sub-pixel G'2,1 signal of the second pixel group is sacrificed. Further, the position of the green sub-pixel of the first pixel group is replaced with the high voltage signal after table looking up, i.e., the first voltage signal G'H1,1, and the original image resolution can be kept. The sacrificed position of the green sub-pixel of the second pixel group is replaced with the low voltage signal after table looking up, i.e., the second voltage signal G'L1,1, to achieve color cast improving and compensating effects.

For such picture distribution, although half signals of the original first picture and the original second picture are sacrificed, a resolution effect equivalently seen from space is not sacrificed due to sequential presentation in adjacent positions of the original picture input signals on timing sequence. The resolution can be kept while the picture content is presented on the frequency of the original picture input signal, a color cast compensation effect is realized, the original picture resolution does not need to be maintained by increasing the picture content through increasing a scan frequency and the color cast improving effect is realized. Position interchange of the sub-pixels of adjacent pictures representing resolution signals achieves more prefect resolution maintaining, and complete image resolution is kept. The color cast defect caused by mismatch of large viewing angle refractive index of crystal liquid is improved, and the method particularly suitable for TN, OCB and VA liquid crystal display panels, the process is simple and the production yield is high.

Presentation of a main role of the blue sub-pixels is not much too related to the presentation of the resolution of the viewing image, and the blue sub-pixels of adjacent first pixel group and the second pixel group, for example, B1,1 and B2,1 in table 1 can be presented by taking one of the sub-pixels as a main representing signal of image resolution.

The blue sub-pixels for example the B1,1 and B2,1 in table 1 of the first pixel group and the second pixel group of the first picture are respectively driven by the first voltage signal and the second voltage signal for example BH1,1 and BL1,1 in table 4 of the blue sub-pixels of the first pixel group of the first picture. The blue sub-pixels for example the B'1,1 and B'2,1 in table 2 of the first pixel group and the second pixel group of the second picture are respectively driven by the second voltage signal and the first voltage signal for example BL2',1 and BH2',1 in table 5 of the blue sub-pixels of the second pixel group of the second picture. The blue sub-pixels are changed along with the red sub-pixels, and the display panels suitable for the higher brightness of the green sub-pixels are also suitable for the display panels with arranged red, green and blue sub-pixels.

Optionally, the blue sub-pixels of the first pixel group and the second pixel group of the first picture are respectively driven by the second voltage signal and the first voltage signal of the blue sub-pixels of the second pixel group of the first picture. The blue sub-pixels of the first pixel group and the second pixel group of the second picture are respectively driven by the first voltage signal and the second voltage signal of the blue sub-pixels of the first pixel group of the second picture. The blue sub-pixels are changed along with the green sub-pixels, and the display panels suitable for the higher brightness of the red sub-pixels are also suitable for the display panels with arranged green, red and blue sub-pixels.

Optionally, the blue sub-pixels can also be driven by an original picture input signal.

In one embodiment, the first pixel group and the second may be adjacent disposed in a same row, i.e., longitudinally adjacently disposed. For example, in table 1, the first pixel group is R1,1, G1,1 and B1,1 and the second pixel group is R2,1, G2,1 and B2,1. As shown in table 4, in the first picture, the red sub-pixel R1,1 of the first pixel group is driven by the first voltage signal RH1,1 of the red sub-pixel of the first pixel group, and the red sub-pixel R2,1 of the second pixel group is driven by the second voltage signal RL1,1 of the red sub-pixel of the first pixel group. The green sub-pixel G1,1 of the second pixel group is driven by the second voltage signal GL2,1 of the green sub-pixel of the second pixel group, and the green sub-pixel G2,1 of the second pixel group is driven by the first voltage signal GH2,1 of the green sub-pixel of the second pixel group. Further, the first pixel group in one pair of pixel groups in adjacent two pairs of pixel groups is adjacent to the second pixel group of the other pair of pixel groups, that is, the first pixel groups in the adjacent two pixel groups are disposed in a staggering manner. In transversely adjacent two pairs of pixel groups, one pair of first pixel groups is disposed above the second pixel groups, and the other pair of first pixel groups is disposed below the second pixel groups. The first pixel groups for realizing the adjacent pixel groups are staggered.

TABLE 6

| RH1,1 | GL1,2 | BH1,1 | RL1,1 | GH1,2 | BL1,1 | RH1,3 | GL1,4 | BH1,3 |
| RL2,2 | GH2,1 | BL2,2 | RH2,2 | GL2,1 | BH2,2 | RL2,4 | GH2,3 | BL2,4 |
| RH3,1 | GL3,2 | BH3,1 | RL3,1 | GH3,2 | BL3,1 | RH3,3 | GL3,4 | BH3,3 |
| RL4,2 | GH4,1 | BL4,2 | RH4,2 | GL4,1 | BH4,2 | RL4,4 | GH4,3 | BL4,4 |
| RH5,1 | GL5,2 | BH5,1 | RL5,1 | GH5,2 | BL5,1 | RH5,3 | GL5,4 | BH5,3 |

TABLE 7

| RL' 1,2 | GH' 1,1 | BL' 1,2 | RH' 1,2 | GL' 1,1 | BH' 1,2 | RL' 1,4 | GH' 1,3 | BL' 1,4 |
| RH' 2,1 | GL' 2,2 | BH' 2,1 | RL' 2,1 | GH' 2,2 | BL' 2,1 | RH' 2,3 | GL' 2,4 | BH' 2,3 |
| RL' 3,2 | GH' 3,1 | BL' 3,2 | RH' 3,2 | GL' 3,1 | BH' 3,2 | RL' 3,4 | GH' 3,3 | BL' 3,4 |
| RH' 4,1 | GL' 4,2 | BH' 4,1 | RL' 4,1 | GH' 4,2 | BL' 4,1 | RH' 4,3 | GL' 4,4 | BH' 4,3 |
| RL' 5,2 | GH' 5,1 | BL' 5,2 | RH' 5,2 | GL' 5,1 | BH' 5,2 | RL' 5,4 | GH' 5,3 | BL' 5,4 |

In one embodiment, the first pixel group and the second may be adjacent disposed in a same column, i.e., transversely adjacently disposed. For example, in table 1, the first pixel group is R1,1, G1,1 and B1,1 and the second pixel group is R2,1, G2,1 and B2,1. As shown in table 6, in the first picture, the red sub-pixel R1,1 of the first pixel group is driven by the first voltage signal RH1,1 of the red sub-pixel of the first pixel group, and the red sub-pixel R2,1 of the second pixel group is driven by the second voltage signal RL1,1 of the red sub-pixel of the first pixel group. The green sub-pixel G1,1 of the first pixel group is driven by the second voltage signal GL1,2 of the green sub-pixel of the second pixel group, and the green sub-pixel G1,2 of the second pixel group is driven by the first voltage signal GH1,2 of the green sub-pixel of the second pixel group. Further, the first pixel group in one pair of pixel groups in adjacent two pairs of pixel groups is adjacent to the second pixel group of the other pair of pixel groups, that is, the first pixel groups in the adjacent two pixel groups are disposed in a staggering manner. In longitudinally adjacent two pairs of pixel groups, one pair of first pixel groups is disposed on the right of the second pixel groups, and the other pair of first pixel groups is disposed on the left of the second pixel groups. The first pixel groups for realizing the adjacent pixel groups are staggered.

In the above embodiment, the first voltage signal being smaller than the second voltage signal may be replaced with the first voltage signal being larger than the second voltage signal.

In the above embodiment, the first pixel group and the second pixel group in the pixel group are changeable in position.

The driving method for a display panel can improve the defect of color cast or chromatic aberration caused by mismatch of a large viewing angle refractive index of the display panel. The display panel may be a twisted nematic (TN) liquid crystal display panel, an optically compensated birefringence (OCB) liquid crystal display panel or vertical alignment (VA) liquid crystal display panel. The display panel for example may also be an organic light emitting diode (OLED) display panel, a quantum dots light-emitting diodes (QLED) display panel or other display panels, but not limited thereto. The display panel may be an RGB three-primary color display panel, an RGBW four-color display panel or RGBY four-color display panel, but not limited thereto. The driving method is also suitable for a situation that the display panel is a curve panel.

Similarly, in the liquid crystal display device, for example, the first voltage signal is larger than the second voltage signal. The third sub-pixel is a blue sub-pixel, and the drive component 730 is further configured to enable the first voltage signal and the second voltage signal for example BH1,1 and BL1,1 in table 4 of the blue sub-pixel of the first pixel group of the first picture to drive the blue sub-pixel for example B1,1 and B2,1 in table 1 of the first pixel group and the second pixel group of the first picture respectively; and further configured to enable the second voltage signal and the first voltage signal for example BL'2,1 and BH'2,1 in table 5 of the blue sub-pixel of the second pixel group of the second picture to drive the blue sub-pixel for example B'1,1 and B'2,1 in table 2 of the first pixel group and the second pixel group of the second picture respectively. The blue sub-pixels are changed along with the red sub-pixels, and the display panels suitable for the higher brightness of the green sub-pixels are also suitable for the display panels with arranged red, green and blue sub-pixels.

Optionally, the drive component 730 is further configured to enable the second voltage signal and the first voltage signal of the blue sub-pixel of the second pixel group of the first picture to drive the blue sub-pixel of the first pixel group and the second pixel group of the first picture respectively; and further configured to enable the first voltage signal and the second voltage signal of the blue sub-pixel of the first pixel group of the second picture to drive the blue sub-pixel of the first pixel group and the second pixel group of the second picture respectively. The blue sub-pixels are changed along with the green sub-pixels, and the display panels suitable for the higher brightness of the red sub-pixels are also suitable for the display panels with arranged green, red and blue sub-pixels.

Optionally, the blue sub-pixels can also be driven by an original picture input signal.

In one embodiment, the first pixel group and the second may be adjacent disposed in a same row, i.e., longitudinally adjacently disposed. For example, in table 1, the first pixel group is R1,1, G1,1 and B1,1 and the second pixel group is R2,1, G2,1 and B2,1. As shown in table 4, in the first picture, the red sub-pixel R1,1 of the first pixel group is driven by the first voltage signal RH1,1 of the red sub-pixel of the first pixel group, and the red sub-pixel R2,1 of the second pixel group is driven by the second voltage signal RL1,1 of the red sub-pixel of the first pixel group. The green sub-pixel G1,1 of the second pixel group is driven by the second voltage signal GL2,1 of the green sub-pixel of the second pixel group, and the green sub-pixel G2,1 of the second pixel group is driven by the first voltage signal GH2,1 of the green sub-pixel of the second pixel group. Further, the first pixel group in one pair of pixel groups in adjacent two pairs of pixel groups is adjacent to the second pixel group of the other pair of pixel groups, that is, the first pixel groups in the adjacent two pixel groups are disposed in a staggering manner. In transversely adjacent two pairs of pixel groups, one pair of first pixel groups is disposed above the second pixel groups, and the other pair of first pixel groups is disposed below the second pixel groups. The first pixel groups for realizing the adjacent pixel groups are staggered. For two pairs of longitudinally adjacent pixel groups, the first pixel groups are disposed above the below the second pixel groups generally.

In one embodiment, the first pixel group and the second may be adjacent disposed in a same column, i.e., transversely adjacently disposed. For example, in table 1, the first pixel group is R1,1, G1,1 and B1,1 and the second pixel group is R2,1, G2,1 and B2,1. As shown in table 6, in the first picture, the red sub-pixel R1,1 of the first pixel group is driven by the first voltage signal RH1,1 of the red sub-pixel of the first pixel group, and the red sub-pixel R2,1 of the second pixel group is driven by the second voltage signal RL1,1 of the red sub-pixel of the first pixel group. The green sub-pixel G1,1 of the first pixel group is driven by the second voltage signal GL1,2 of the green sub-pixel of the second pixel group, and the green sub-pixel G1,2 of the second pixel group is driven by the first voltage signal GH1,2 of the green sub-pixel of the second pixel group. Further, the first pixel group in one pair of pixel groups in adjacent two pairs of pixel groups is adjacent to the second pixel group of the other pair of pixel groups, that is, the first pixel groups in the adjacent two pixel groups are disposed in a staggering manner. In longitudinally adjacent two pairs of pixel groups, one pair of first pixel groups is disposed on the right of the second pixel groups, and the other pair of first pixel groups is disposed on the left of the second pixel groups. The first pixel groups for realizing the adjacent pixel groups are staggered.

In the above embodiment, the first voltage signal being smaller than the second voltage signal may be replaced with the first voltage signal being larger than the second voltage signal.

The display device can improve the defect of color cast or chromatic aberration caused by mismatch of a large viewing angle refractive index of the display panel. The display panel may be a TN liquid crystal display panel, an OCB liquid crystal display panel or VA liquid crystal display panel. The display panel for example may also be an OLED display panel, a QLED display panel or other display panels, but not limited thereto. The display panel may be an RGB three-primary color display panel, an RGBW four-color display panel or RGBY four-color display panel, but not limited thereto. The driving method is also suitable for a situation that the display panel is a curve panel.

In the above embodiment, the first sub-pixel, the second sub-pixel and the third sub-pixel that each of the first pixel group and the second pixel group includes may be one or more.

The respective technical features of the above embodiments can be freely combined, in order for concise description, not all possible combinations of the respective technical features of the above embodiments are described, however, as long as the combinations of these respective technical features do not conflict against each other, they are considered to be in a range recorded by the disclosure.

The foregoing merely expresses several embodiments of the disclosure, which are described in a relatively specific and detailed manner, but should be understood as a limitation to the scope of the disclosure. It should be pointed out that those ordinary skilled in the art could make a plurality of transformations and improvements without departing from a concept of the disclosure, and they all fall within the protective scope of the disclosure. Therefore, a protective scope of the disclosure should take appended claims as a criterion.

What is claimed is:

1. A liquid crystal display device, comprising a backlight module having backlight component divided into a plurality of backlight sub-areas, wherein the liquid crystal display device further comprises
   a display panel having a display component, wherein pixels on the display panel are divided into a plurality of pixel groups, each pixel group comprises a first pixel group and a second pixel group adjacent to each other, and each of the first pixel group and the second pixel group comprises a first sub-pixel, a second sub-pixel and a third sub-pixel;
   a control component, configured to look up a table to acquire a first voltage signal and a second voltage signal unequal to each other and corresponding to each sub-pixel according to a picture input signal, and enabling a front viewing angle mixing brightness of the sub-pixel alternately driven by the first voltage signal and the second voltage signal to be equivalent to a front viewing angle brightness of the sub-pixel driven by the picture input signal, wherein the picture input signal comprises a first picture and a second picture in adjacent timing sequence;
   a drive component, connected to the display component and the control component respectively, and configured to display each picture with two frame images in sequence; the drive component and the display component are integrated on the display panel; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
   wherein the drive component is further configured to enable the first voltage signal and the second voltage signal of the first sub-pixel of the first pixel group of the first picture to drive the first sub-pixel of the first pixel group and the second pixel group of the first picture respectively; further configured to enable the second voltage signal and the first voltage signal of the second sub-pixel of the second pixel group of the first picture to drive the second sub-pixel of the first pixel group and the second pixel group of the first picture respectively; further configured to enable the second voltage signal and the first voltage signal of the first sub-pixel of the second pixel group of the second picture to drive the first sub-pixel of the first pixel group and the second pixel group of the second picture respectively; and further configured to enable the first voltage signal and the second voltage signal of the second sub-pixel of the first pixel group of the second picture to drive the second sub-pixel of the first pixel group and the second pixel group of the second picture respectively;
   a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and
   a backlight adjusting component, connected to the backlight control component and the backlight component respectively, and configured to perform independent brightness adjustment on a backlight source of the sub-pixels of various colors in corresponding backlight sub-areas in respective frame images of a next picture.

2. The liquid crystal display device according to claim 1, further comprising a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

3. The liquid crystal display device according to claim 1, wherein the backlight control component comprises
   a counting unit, configured to count average drive voltages of the sub-pixels of various colors in the first frame image area and the second frame image area corresponding to each backlight sub-area; and
   a calculating unit, configured to solve the backlight brightness adjustment signals according to the average drive voltages, reference backlight brightness signals and reference drive voltages of respective backlight sub-areas.

4. The liquid crystal display device according to claim 3, wherein a calculating formula for the calculating unit to solve the backlight brightness adjustment signal of the sub-pixels of each color in each backlight sub-area is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub-area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

5. The liquid crystal display device according to claim 1, further comprising a backlight module, wherein the backlight component, the backlight control component and the backlight adjusting component are integrated on the backlight module.

6. The liquid crystal display device according to claim 1, wherein the backlight source is a white light backlight source, an RGB backlight source, an RGBW backlight source or RGBY backlight source.

7. The liquid crystal display device according to claim 3, wherein the backlight source is a white light backlight source, an RGB backlight source, an RGBW backlight source or RGBY backlight source.

8. The liquid crystal display device according to claim 5, wherein the backlight source is a white light backlight source, an RGB backlight source, an RGBW backlight source or RGBY backlight source.

9. The liquid crystal display device according to claim 1, further comprising a display panel, wherein the display component and the drive component are integrated on the display panel.

10. The liquid crystal display device according to claim 1, wherein the drive component further comprises a timing controller.

11. The liquid crystal display device according to claim 1, wherein the first sub-pixel is a red sub-pixel, and the second sub-pixel is a green sub-pixel.

12. The liquid crystal display device according to claim 11, wherein the third sub-pixel is a blue sub-pixel, and the drive component is further configured to enable the first voltage signal and the second voltage signal of the blue sub-pixel of the first pixel group of the first picture to drive the blue sub-pixel of the first pixel group and the second pixel group of the first picture respectively; and further configured to enable the second voltage signal and the first voltage signal of the blue sub-pixel of the second pixel group of the second picture to drive the blue sub-pixel of the first pixel group and the second pixel group of the second picture respectively.

13. The liquid crystal display device according to claim 11, wherein the third sub-pixel is a blue sub-pixel, and the drive component is further configured to enable the second voltage signal and the first voltage signal of the blue sub-pixel of the second pixel group of the first picture to drive the blue sub-pixel of the first pixel group and the second pixel group of the first picture respectively; and further configured to enable the first voltage signal and the second voltage signal of the blue sub-pixel of the first pixel group of the second picture to drive the blue sub-pixel of the first pixel group and the second pixel group of the second picture respectively.

14. The liquid crystal display device according to claim 11, wherein the third sub-pixel is the blue sub-pixel, and the blue sub-pixel is driven by an original picture input signal.

15. The liquid crystal display device according to claim 1, wherein the first pixel group and the second pixel group are in a same column and disposed adjacently, and the first pixel group in one pair of pixel groups in adjacent two pairs of pixel groups is adjacent to the second pixel group of the other pair of pixel groups.

16. The liquid crystal display device according to claim 1, wherein the first pixel group and the second pixel group are in a same row and disposed adjacently, and the first pixel group in one pair of pixel groups in adjacent two pairs of pixel groups is adjacent to the second pixel group of the other pair of pixel groups.

17. The liquid crystal display device according to claim 1, wherein the display panel is a twisted nematic liquid crystal display panel, an optically compensated birefringence liquid crystal display panel or vertical alignment liquid crystal display panel.

18. The liquid crystal display device according to claim 1, wherein the display panel is an RGB three-primary color panel, an RGBW four-color panel and an RGBY four-color panel.

19. A liquid crystal display device, comprising a display component and a backlight component divided into a plurality of backlight sub-areas, wherein the liquid crystal display device further comprises
  a drive component, connected to the display component, and configured to display each picture with two frame images in sequence; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
  a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; wherein the backlight control component comprises
  a counting unit, configured to count average drive voltages of the sub-pixels of various colors in the first frame image area and the second frame image area corresponding to each backlight sub-area; and
  a calculating unit, configured to solve the backlight brightness adjustment signals according to the average drive voltages, reference backlight brightness signals and reference drive voltages of respective backlight sub-areas;
  a backlight adjusting component, connected to the backlight control component and the backlight component respectively, and configured to perform independent brightness adjustment on a backlight source of the sub-pixels of various colors in corresponding backlight sub-areas in respective frame images of a next picture; and
  a backlight module, wherein the backlight component, the backlight control component and the backlight adjusting component are integrated on the backlight module.

20. The liquid crystal display device according to claim 19, wherein the backlight brightness adjusting signals comprise a red sub-pixel backlight brightness adjusting signal group, a green sub-pixel backlight brightness adjusting signal group and a blue sub-pixel backlight brightness adjusting signal group, to perform independent backlight brightness adjustment control on the sub-pixels of various colors in respective backlight subareas.

* * * * *